(12) United States Patent
Harper et al.

(10) Patent No.: US 8,081,109 B2
(45) Date of Patent: Dec. 20, 2011

(54) METHOD AND APPARATUS FOR DETERMINING THE GEOGRAPHIC LOCATION OF A DEVICE

(75) Inventors: Neil Harper, Mangerton (AU); Peter Nicholson, Bulli (AU)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 12/717,239

(22) Filed: Mar. 4, 2010

(65) Prior Publication Data

US 2010/0156707 A1    Jun. 24, 2010

Related U.S. Application Data

(62) Division of application No. 11/525,132, filed on Sep. 22, 2006, now Pat. No. 7,733,268.

(51) Int. Cl.
*G01S 19/28* (2010.01)

(52) U.S. Cl. .................................. 342/357.67

(58) Field of Classification Search ... 342/357.2–357.78
See application file for complete search history.

(56) References Cited

U.S. PATENT DOCUMENTS

| | | | |
|---|---|---|---|
| 5,390,124 A * | 2/1995 | Kyrtsos | 701/215 |
| 5,931,889 A | 8/1999 | Misra | |
| 6,061,018 A | 5/2000 | Sheynblat | |
| 6,560,536 B1 | 5/2003 | Sullivan et al. | |
| 6,725,158 B1 * | 4/2004 | Sullivan et al. | 701/213 |
| 6,864,836 B1 | 3/2005 | Hatch et al. | |
| 7,156,328 B2 | 1/2007 | Samaha | |
| 7,501,981 B2 * | 3/2009 | Rahman et al. | 342/357.58 |
| 2004/0132464 A1 | 7/2004 | Poykko et al. | |
| 2006/0103574 A1 | 5/2006 | Greier et al. | |
| 2007/0115171 A1 | 5/2007 | Rahman et al. | |

OTHER PUBLICATIONS

Neil Harper et al., "Process for Improving GPS Acquisition Assistance Data and Server-Side Location Determination for Cellular Networks," Journal of Global Positioning Systems, (2004), vol. 3, No. 1-3, pp. 132-142.

* cited by examiner

*Primary Examiner* — Thomas Tarcza
*Assistant Examiner* — Nga Nguyen
(74) *Attorney, Agent, or Firm* — Duane Morris, LLP

(57) ABSTRACT

A method and apparatus for determining the location of a device from signals provided by a plurality of satellites. A device receives a first plurality of signals comprising one signal from each of a first plurality of satellites and determines a first location of the device as a function of the first plurality of signals. The device then determines a second location thereof as a function of a second plurality of signals if the first location is not within a predetermined threshold. The second plurality of signals is a first subset of the first plurality of signals.

27 Claims, 4 Drawing Sheets

300

302
Receive first plurality of signals from first plurality of satellites

304
Determine first location

306
Determine second location if first location not within predetermined threshold

308
Determine third location if second location not within predetermined threshold

FIG. 3

METHOD AND APPARATUS FOR DETERMINING THE GEOGRAPHIC LOCATION OF A DEVICE

CROSS-REFERENCE TO RELATED APPLICATION

The instant application is a divisional application of application Ser. No. 11/525,132 filed Sep. 22, 2006, now U.S. Pat. No. 7,733,268 issued on Jun. 8, 2010, the entirety of which is incorporated herein by reference.

BACKGROUND

It is important to determine the location of a mobile telephone or other mobile device capable of radio communication especially in an emergency situation. One method of assessing geolocation of a mobile device is utilizing the mobile device in conjunction with a geolocation system. Exemplary geolocation systems include satellite navigation systems. For example, one Global Navigation Satellite System (GNSS) is the NAVSTAR Global Positioning System (i.e., GPS). GPS is a radio positioning system providing subscribers with highly accurate position, velocity, and time (PVT) information.

FIG. 1 is a schematic representation of a constellation 100 of GPS satellites 101. With reference to FIG. 1, GPS includes a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are visible at any given time.

With GPS, signals from the satellites arrive at a GPS receiver and are utilized to determine the position of the receiver. GPS position determination is made based on the time of arrival (TOA) of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multilateration. However, given the expense of providing a receiver clock whose time is exactly synchronized, conventional systems account for the amount by which the receiver clock time differs from the satellite clock time when computing a user's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time is the instantaneous bias between the receiver clock and the satellite clock.

However, the signal received from each of the visible satellites does not necessarily result in an accurate position estimation. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference. With standalone GPS navigation or geographic location, where a user with a GPS receiver obtains code-phase ranges with respect to a plurality of satellites in view, without consulting with any reference station, the user is very limited in ways to reduce the errors or noises in the ranges.

One method and apparatus to eliminate erroneous GPS signals is disclosed by copending U.S. application Ser. No. 11/405,404, filed Apr. 18, 2006 by the inventors hereof, entitled, "Method and Apparatus for Geolocation Determination," the entirety of which is herein incorporated by reference. This invention compares predicted C/A chips with measured chips and discards satellite signals having significant inconsistencies. However, pruning erroneous GPS signals based on code phase prediction may not be necessary if no erroneous signals exist, and such a technique may require a reasonably accurate cell database.

Accordingly, there is a need for a method and apparatus for geographic location determination of a device that would overcome the deficiencies of the prior art. Therefore, an embodiment of the present subject matter provides a method for determining the location of a device. The method comprises the steps of receiving a first plurality of signals comprising one signal from each of a first plurality of satellites and determining a first location of the device as a function of the first plurality of signals. If the first location is not within a predetermined threshold then the method comprises the step of determining a second location of the device as a function of a second plurality of signals wherein the second plurality of signals is a first subset of the first plurality of signals. An alternative embodiment may further comprise the step of determining a third location of the device as a function of a third plurality of signals if the second location is not within the predetermined threshold, wherein the third plurality of signals is a second subset of the first plurality of signals.

In another embodiment of the present subject matter a method is provided for determining the location of a device receiving signals from each of a plurality of satellites, the device having determined a first location from the plurality of satellite. The method comprises the steps of comparing a quality of the first location of the device with a predetermined threshold and determining a second location of the device from a first subset of the received signals if the quality of the first location is not within the predetermined threshold. Additional embodiments may further comprise the step of determining a third location of the device as a function of a second subset of the received signals if the quality of the second location is not within the predetermined threshold.

In yet another embodiment of the present subject matter a method is provided for determining the location of a device. The method comprises the steps of receiving a plurality of signals from a plurality of satellites, generating estimates of a location of the device using combinations of the plurality of signals, and selecting an estimate as defined by a quality of each of the combinations.

An alternative embodiment of the present subject matter provides an apparatus comprising a receiver for receiving a first plurality of signals comprising one signal from each of a first plurality of satellites and a means for determining a first location of the apparatus as a function of the first plurality of signals. The apparatus may further comprise a means for determining a second location of the apparatus as a function of a second plurality of signals if the first location is not within a predetermined threshold, wherein the second plurality of signals is a first subset of the first plurality of signals. Additional embodiments of an apparatus according to the present matter may further comprise a means for determining a third location of the apparatus as a function of a third plurality of signals if the second location is not within the predetermined threshold, wherein the third plurality of signals is a second subset of the first plurality of signals.

An additional embodiment of the present subject matter provides an apparatus for determining location from signals received from a plurality of Global Navigation Satellite System ("GNSS") satellites. The apparatus comprises a receiver for receiving signals from each of a plurality of satellites, a means for determining a first location of the device as a function of a quality of the received signals, and a means for determining a second location of the device as a function of a subset of said received signals if said quality is not within a predetermined threshold.

In still another embodiment of the present subject matter a method is provided for calculating the position of a device. The method comprises the steps of receiving a first plurality of observations from a first plurality of satellites and determining a first position of the device as defined by a quality of the first plurality of observations. If the quality of the first plurality of observations fails to meet the predefined threshold then the method comprises the steps of determining a second position of the device as defined by a quality of a second plurality of observations, the second plurality being a subset of the first plurality of observations. If the quality of the second plurality of observations fails to meet the predefined threshold then additional positions of the device are determined utilizing incrementally decreasing subsets of observations until a predetermined criteria is achieved.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 3 is an algorithm according to another embodiment of the present subject matter.

DETAILED DESCRIPTION

With reference to the figures where like elements have been given like numerical designations to facilitate an understanding of the present subject matter, the various embodiments of a system and method for determining the geographic location of a device are herein described.

The disclosure relates to methods and apparatuses for determining geolocation using satellite signals as well as for pruning erroneous satellite signals. The satellites may be considered as part of a Global Navigation Satellite System ("GNSS"), such as, for example, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou. Therefore, references in the disclosure to GPS and/or GNSS, where applicable, as known to those of skill in the art, apply to the above-listed GNSS systems as well as other GNSS systems not listed above.

Figure 1:
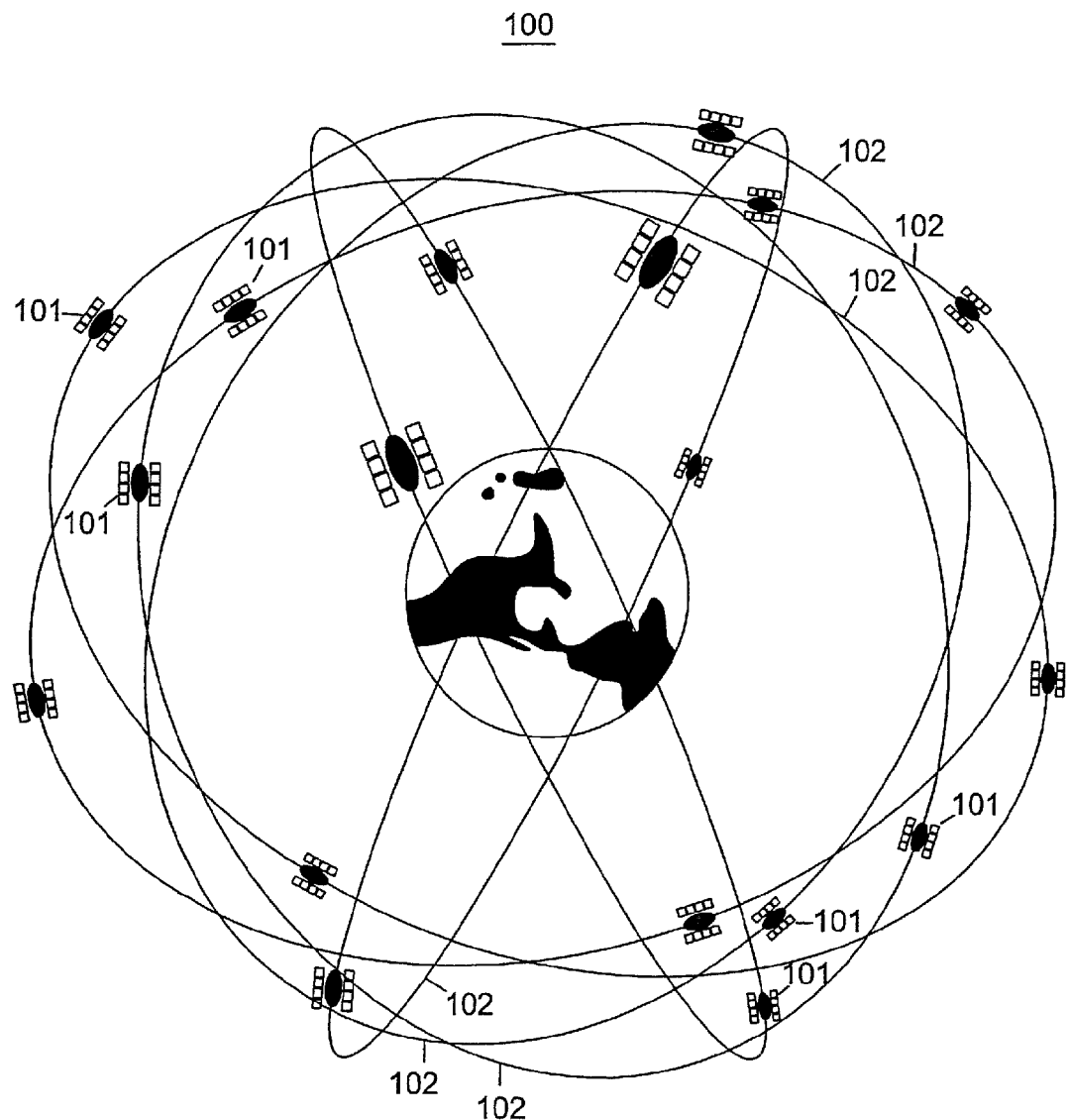
FIG. 1 is a schematic representation of a constellation of GPS satellites.
Figure 2:
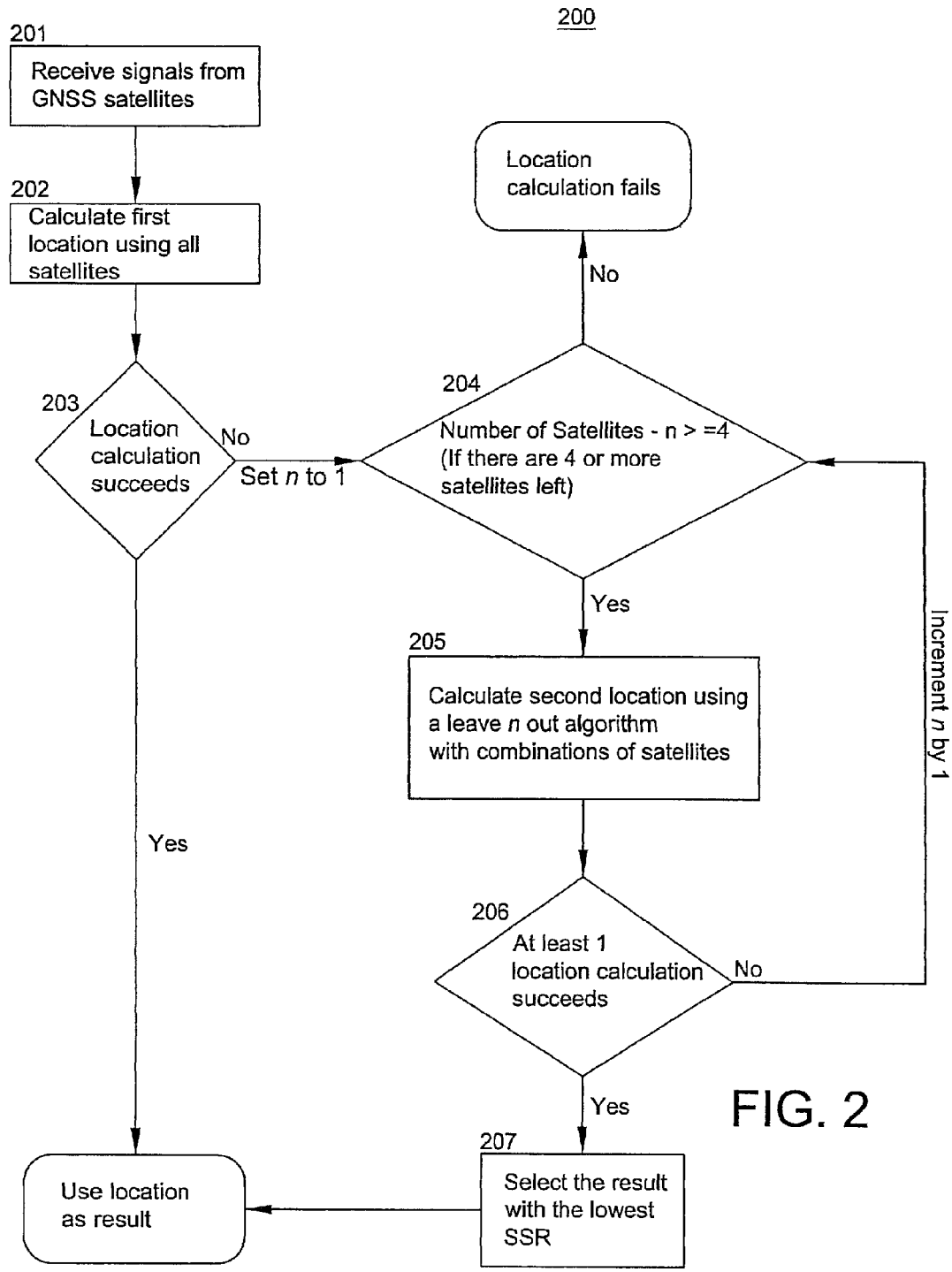
FIG. 2 is an algorithm according to one embodiment of the present subject matter.

FIG. 2 is an algorithm 200 according to one embodiment of the present subject matter. With reference to FIG. 2, in step 201, a device receives signals from all satellites within view. The device may be a receiver such as a mobile unit. An exemplary mobile unit may include a cellular device, text messaging device, computer, portable computer, vehicle locating device, vehicle security device, communication device, or wireless transceiver. While step 201 may be implemented at a device such as a GPS receiver, step 201 may also be implemented at a different location and communicated to the receiver. For example, if the receiver is adapted to receive cellular signals (e.g., the receiver is part of a cellular telephone), the receiver may obtain its approximate location from a cell network's Mobile Location Center (MLC). The MLC may identify the cell in which the mobile is located or the location of the closest base station. This information may enable the receiver to possess a general understanding of its location (i.e., the receiver is in an area serviceable by the identified cell). It should also be noted that a receiver is only one exemplary means for implementing the embodiments disclosed herein and other means such as a transceiver may be equally used without departing from the principles of the present subject matter.

In step 202, a first location of the receiver may be calculated as a function of the received from all the satellites within view. The receiver may identify each satellite and its location information. The location information may be obtained, for example, by collecting broadcast ephemeris information from one or more visible GPS satellites. The ephemeris information may also be obtained from a source other than the satellite itself. For example, the MLC may be configured to track the location of each satellite and provide this information to the receiver upon request.

In step 203, if the first location calculation is within a predetermined threshold, then this location is utilized; however, if the first location calculation is not within the predetermined threshold, then n is set to one (1), wherein n denotes an integer number of satellites. In step 204, if there are four or more satellite measurements remaining, that is: NumberOfSatellites−n≧4, then the algorithm 200 proceeds to step 205 and calculates a location for each different combination of satellite measurements while leaving out n satellite measurements for each combination. In step 206, if none of the locations calculated are within the predetermined threshold, then n is incremented by one (1) and the algorithm 200 proceeds to step 204.

In step 207, if more than one combination of satellite signals is within the predetermined threshold, then the location of the receiver having a lowest sum of the squared residuals (SSR), i.e., a measure of the quality of a location fix that is a function of the GPS position calculation least squares process, is selected. Of course, location estimates may be selected based upon ephemeris information or other information indicative of the quality of the satellite signals. Further, if the receiver or device is in communication with a cellular network, location estimates may be selected as a function of information provided by the cellular network. Thus, the algorithm 200 may minimize the number of combinations or iterations of signals to be tested by first leaving out one satellite signal and then leaving out two, three, etc., satellite signals.

FIG. 3 is an algorithm 300 according to another embodiment of the present subject matter. With reference to FIG. 3, in step 302, a first plurality of signals is received at a device comprising one signal from each of a first plurality of satellites. The device may be a receiver such as a mobile unit, and an exemplary mobile unit may include a cellular device, text messaging device, computer, portable computer, vehicle locating device, vehicle security device, communication device, or wireless transceiver. Of course, step 302 may be implemented at a GPS receiver or a different location and communicated to the receiver. Thus, the receiver may obtain its approximate location from an MLC, and the MLC may identify the cell in which the mobile is located or the location of the closest base station. It should also be noted that a receiver is only one exemplary means for implementing the embodiments disclosed herein and other means such as a transceiver may be equally used without departing from the principles of the present subject matter.

In step 304, a first location of the device may be determined as a function of the first plurality of signals. The device may identify each satellite and its location information. The location information may be obtained, for example, by collecting broadcast ephemeris information from visible GPS satellites. The ephemeris information may also be obtained from a source other than the satellite itself such as an MLC configured to track the location of each satellite and provide this information to the mobile receiver upon request.

In step 306, a second location of the device may be determined as a function of a second plurality of signals if the first location is not within a predetermined threshold. The second plurality of signals is a first subset of the first plurality of signals. In step 308, a third location of the device may be determined as a function of a third plurality of signals if the second location is not within the predetermined threshold. The third plurality of signals is a second subset of the first plurality of signals. Thus, the algorithm 300 may minimize the number of combinations or iterations of signals to be tested by first leaving out one satellite signal and then leaving out two satellite signals. For example, if the first location is not within the predetermined threshold, then a second location of the device will be determined utilizing combinations of satellite signals with one satellite signal excluded. If the second location is not within the predetermined threshold, then a third location of the device will be determined utilizing combinations of satellite signals with two satellite signals excluded. If more than one combination of satellite signals is within the predetermined threshold, then the location of the device having a lowest SSR may be selected. Of course, location estimates may be selected based upon ephemeris information or other information indicative of the quality of the satellite signals, and location estimates may be selected as a function of information provided by a cellular network if the receiver or device is in communication with the cellular network. Thus, algorithms according to the present subject matter may provide an incremental method of trialing different combinations or subsets of satellite signals as input to a position determination or calculation.

Locations of a device may be conducted by a parametric least-squares algorithm or other algorithms known in the art. The parametric least-squares algorithm is generally based upon a series of matrix manipulations having at least one output typically identified as the variance factor. In embodiments of the present subject matter, if the variance factor is not within a predetermined threshold or is significantly large, then the device's determined location fails. Such a failure may be the result of one or a combination of several problems. For example, a location may fail because the GPS satellite location was calculated incorrectly, a seed location utilized to calculate the device's position was >100 km from a positioning determining entity's location, or inaccuracies in the satellite signals or erroneous satellite signals were received. Various factors may contribute or cause such inaccuracies or errors such as ephemeris error, satellite clock timing error, atmospheric effects, receiver noise and multipath.

If a device receives or calculates erroneous signals and pre-processing of the signals is not performed, the yield of a device's position determination may be significantly affected. A high quality GPS yield is critical to the operation of an SMLC (serving mobile location center), GMLC (gateway mobile location center), SAS (stand alone SMLC) or SUPL (secure user plane location) platforms. For example, Table 1 illustrates the effect of erroneous input data in a GPS position determination. In the following table, the code phase "chips" measurement for a particular satellite was manually manipulated to illustrate the effect of erroneous GPS signals.

TABLE 1

| Chip offset | Result distance from ground truth meters |
| --- | --- |
| 0 | 1.7239967161342793 |
| 1 | 174.19052731004507 |
| 2 | 346.70201634947557 |
| 3 | 519.208316511694 |
| 4 | fail |
| 5 | fail |

Table 1 provides an illustration of the effect of manipulating the chips for one satellite for a particular GPS signal. The table further shows that the location error increases significantly when the chips measurement is altered, and when the chip measurement is four chips from the original value, the least squares implementation cannot converge upon a solution.

Further testing was conducting by corrupting code phase measurements to simulate erroneous GPS data. The following results provide a yield (and an accuracy in brackets) when "corrupting" a plurality of satellites in a GPS signal from a NovAtel GPS receiver. The GPS signals in the following example were 80657 distinct pseudorange measurements taken from the NovAtel GPS receiver over a twenty-four hour period with an average cardinality of eight satellites in view during this period. For the following examples, erroneous satellite data was produced through the addition of a random number between 0 and 1023 to the measured chips keeping it in the range from 0 to 1023 as shown below in Equation 1.

$$\text{chips} = ((\text{random}(\_) * 1024) + \text{chips}) \% 1024 \quad (1)$$

For each GPS signal, the "corrupted" satellite(s) were randomly selected within the GPS signal. Further, the following tables identify the yield as a percentage with the resulting distance from the ground truth for the position calculations that succeed.

Table 2 provides an analysis of yield when no attempt is made to remove erroneous satellite ("sat") signals, i.e., no pre-processing, from a position determination. The results identified in Table 2 illustrate that with more than one erroneous satellite signal, yield drops significantly and unacceptably. The results identified in Table 2 may be indicative of situations encountered in a regional or country environment where there exists little signal interference and cells are likely to be large (up to 40 km).

TABLE 2

|  | 0 bad sats | 1 bad sat | 2 bad sats | 3 bad sats | 4 bad sats |
| --- | --- | --- | --- | --- | --- |
| 1 Km initial offset | 100 (4.2) | 89.3 (9.7) | 60.7 (22.3) | 10.3 (261.2) | 7.8 (530.9) |
| 5 Km offset | 100 (4.2) | 89.2 (9.0) | 60.8 (18.2) | 10.4 (213.3) | 7.9 (663.7) |
| 10 Km offset | 100 (4.2) | 89.2 (8.0) | 60.7 (20.3) | 10.5 (238.4) | 7.9 (631.9) |
| 15 Km offset | 100 (4.2) | 89.2 (9.3) | 60.5 (22.11) | 10.4 (257.9) | 7.9 (643.3) |
| 20 Km offset | 100 (4.2) | 89.2 (8.4) | 60.7 (28.7) | 10.5 (301.2) | 7.9 (657.0) |
| 25 Km offset | 100 (4.2) | 89.9 (8.5) | 60.6 (20.6) | 10.4 (305.9) | 8.0 (601.0) |
| 30 Km offset | 100 (4.2) | 89.6 (8.8) | 60.7 (28.9) | 10.3 (248.9) | 8.0 (770.8) |
| 35 Km offset | 100 (4.2) | 89.3 (8.8) | 60.4 (21.9) | 10.3 (301.1) | 7.8 (693.2) |
| 40 Km offset | 100 (4.2) | 89.3 (8.4) | 60.6 (25.0) | 10.4 (316.5) | 7.9 (677.8) |

Table 3 provides an analysis of the yield and accuracy when the number of satellite signals provided to a device is trimmed to the minimum cardinal number and no attempt is made to remove erroneous satellite signals. For example, for no erroneous satellite signals, only four satellite signals are provided to the device; for one erroneous satellite signal, five satellite signals are provided (with one providing an incorrect or erroneous signal); for two erroneous satellite signals, six satellite signals are provided (with two providing erroneous signals). Such results may be indicative of situations occurring in an urban environment.

TABLE 3

|  | 4 good sats 0 bad sats | 4 good sats 1 bad sat | 4 good sat 2 bad sats | 3-4 good sats 3 bad sats | 2-4 good sats 4 bad sats |
| --- | --- | --- | --- | --- | --- |
| 1 Km offset | 88.0 (11.8) | 21.1 (18752) | 9.9 (3504) | 9.6 (3051) | 9.5 (3140) |
| 5 Km offset | 88.0 (11.8) | 22.0 (18714) | 9.9 (2784) | 9.6 (3261) | 9.6 (3140) |
| 10 Km offset | 87.9 (11.8) | 22.3 (18723) | 9.7 (3578) | 9.7 (3017) | 9.6 (2854) |
| 15 Km offset | 88.0 (11.8) | 22.1 (18869) | 9.7 (3840) | 9.5 (3231) | 9.5 (3102) |
| 20 Km offset | 87.9 (11.8) | 21.7 (19148) | 10.0 (3516) | 9.7 (3244) | 9.5 (3097) |
| 25 Km offset | 87.9 (11.8) | 21.7 (18383) | 9.8 (3627) | 9.7 (3033) | 9.4 (2800) |
| 30 Km offset | 88.0 (11.8) | 21.5 (18606) | 10.0 (3722) | 9.6 (3071) | 9.4 (2944) |
| 35 Km offset | 88.0 (11.9) | 21.5 (18402) | 9.6 (3365) | 9.5 (2920) | 9.5 (2903) |
| 40 Km offset | 87.8 (11.9) | 21.2 (18158) | 9.6 (3567) | 9.5 (2862) | 9.6 (2899) |

With reference to Table 3, it is illustrated that upon receipt of at least one erroneous satellite signal, the yield drops off significantly and unacceptably.

Table 4 provides an analysis of yield after pre-processing of a plurality of satellite signals by a device utilizing an exemplary algorithm according to the present subject matter. The results identified in Table 4 may be indicative of situations encountered in a regional or country environment where there exists little signal interference and cells are likely to be large (up to 40 km).

TABLE 4

|  | 0 bad sats | 1 bad sat | 2 bad sats | 3 bad sats | 4 bad sats |
| --- | --- | --- | --- | --- | --- |
| 1 Km initial offset | 100 (4.2) | 100 (27.8) | 100 (379) | 99.4 (2406) | 79.6 (10455) |
| 5 Km offset | 100 (4.2) | 100 (23.5) | 100 (394) | 99.4 (2460) | 79.6 (10141) |

TABLE 4-continued

|              | 0 bad sats  | 1 bad sat    | 2 bad sats  | 3 bad sats   | 4 bad sats   |
|--------------|-------------|--------------|-------------|--------------|--------------|
| 10 Km offset | 100 (4.2)   | 100 (23.8)   | 100 (408)   | 99.3 (2490)  | 79.6 (10312) |
| 15 Km offset | 100 (4.2)   | 100 (27.3)   | 100 (379)   | 99.3 (2464)  | 79.6 (20822) |
| 20 Km offset | 100 (4.2)   | 100 (30.1)   | 100 (357)   | 99.4 (2482)  | 79.6 (20914) |
| 25 Km offset | 100 (4.2)   | 100 (23.8)   | 100 (380)   | 99.4 (2519)  | 79.6 (10270) |
| 30 Km offset | 100 (4.2)   | 100 (24.9)   | 100 (348)   | 99.4 (2409)  | 79.5 (10135) |
| 35 Km offset | 100 (4.2)   | 100 (21.5)   | 100 (360)   | 99.4 (2413)  | 79.5 (10075) |
| 40 Km offset | 100 (4.2)   | 100 (25.8)   | 100 (335)   | 99.3 (2391)  | 79.5 (9872)  |

Table 5 shows the yield and accuracy by a device utilizing an exemplary algorithm according to the present subject matter when the number of satellite signals provided to a device is trimmed to the minimum cardinal number. For example, for no erroneous satellite signals, only four satellite signals are provided to the device; for one erroneous satellite signal, five satellite signals are provided (with one providing an incorrect or erroneous signal); for two erroneous satellite signals, six satellite signals are provided (with two providing erroneous signals). Such results may be indicative of situations occurring in an urban environment.

TABLE 5

|              | 4 good sats<br>0 bad sats | 4 good sats<br>1 bad sat | 4 good sat<br>2 bad sats | 3-4 good sats<br>3 bad sats | 2-4 good sats<br>4 bad sats |
|--------------|---------------------------|--------------------------|--------------------------|-----------------------------|-----------------------------|
| 1 Km offset  | 87.9 (11.7)               | 91.9 (1427)              | 94.0 (1851)              | 95.4 (1914)                 | 96.0 (1944)                 |
| 5 Km offset  | 88.0 (11.6)               | 92.0 (1587)              | 94.0 (1921)              | 95.3 (2126)                 | 96.0 (2255)                 |
| 10 Km offset | 87.8 (11.6)               | 91.9 (1630)              | 94.0 (1851)              | 95.3 (2513)                 | 95.9 (2756)                 |
| 15 Km offset | 87.7 (11.7)               | 91.8 (1925)              | 94.0 (2690)              | 95.5 (3124)                 | 96.0 (3533)                 |
| 20 Km offset | 87.9 (11.7)               | 91.9 (2229)              | 94.1 (3265)              | 95.5 (3952)                 | 95.9 (4509)                 |
| 25 Km offset | 87.9 (11.7)               | 91.7 (2620)              | 93.8 (3991)              | 95.1 (4968)                 | 95.9 (5793)                 |
| 30 Km offset | 88.0 (11.9)               | 91.8 (3112)              | 93.9 (4961)              | 95.4 (6203)                 | 95.8 (7305)                 |
| 35 Km offset | 88.0 (11.9)               | 91.9 (3647)              | 93.8 (5870)              | 95.2 (7611)                 | 95.7 (8987)                 |
| 40 Km offset | 88.1 (11.9)               | 91.8 (4320)              | 93.8 (7101)              | 95.2 (9045)                 | 95.8 (10650)                |

With reference to Tables 1-3, it has been illustrated that when no pre-processing of GPS signals occurs, the corresponding yield drops significantly depending upon the number of satellites providing erroneous signals. For example, with one erroneous satellite signal the yield drops to 90%, with two erroneous satellite signals the yield drops to 60%, with three erroneous satellite signals the yield drops to 10%, and with four erroneous satellite signals the yield drops to 8%. To the contrary, the technique according to the present subject matter produces a far superior result in terms of yield as shown in Tables 4 and 5.

Figure 4:
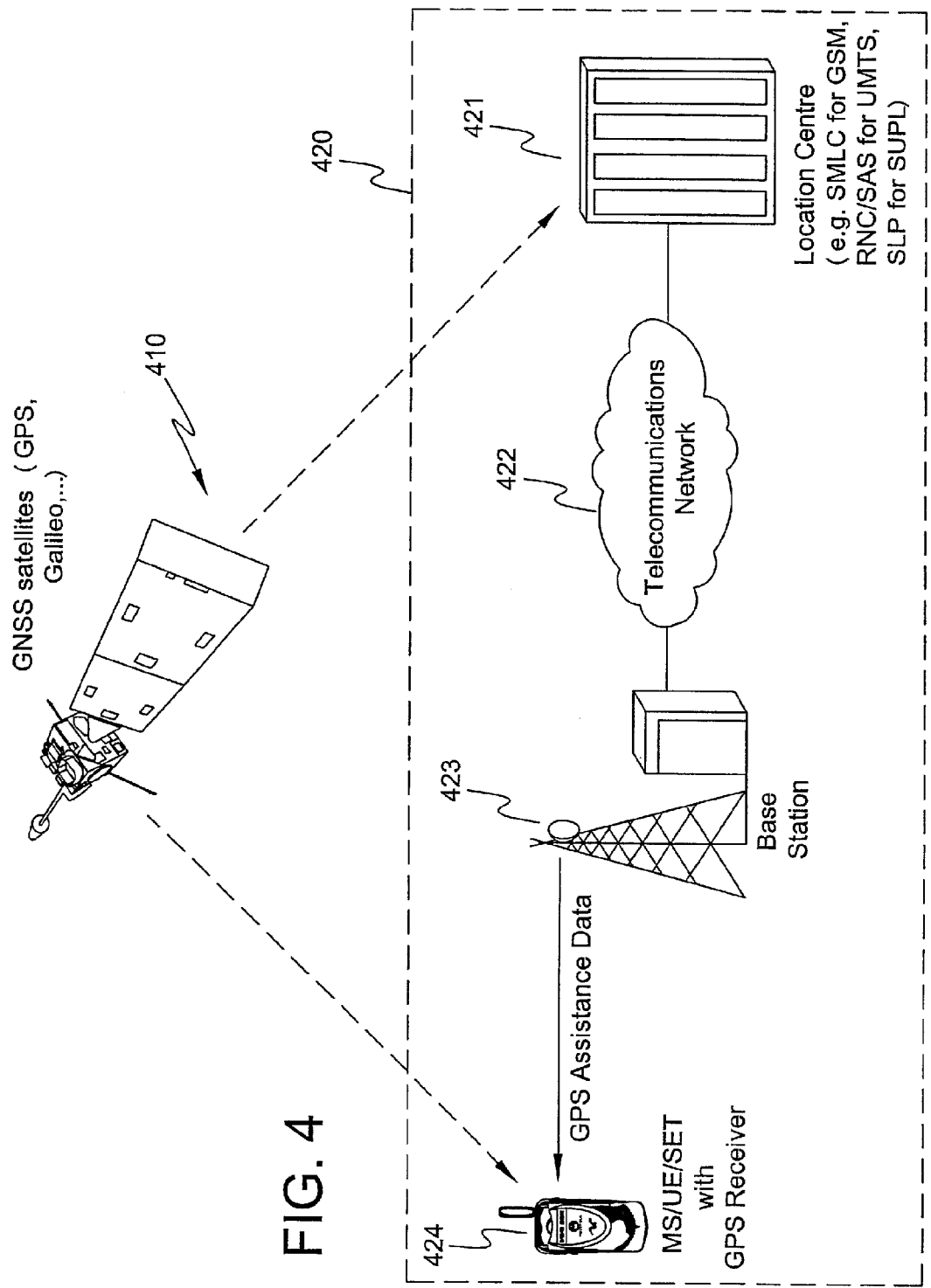
FIG. 4 is a schematic representation for implementing one embodiment of the present subject matter.

FIG. 4 is a schematic representation for implementing one embodiment of the present subject matter. With reference to FIG. 4, a satellite system 410 communicates with a ground system 420. The ground system 420 may include a cellular network having a location center 421. The location center 421 may be a Mobile Location Center (MLC) a central office configured to communicate with a telecommunication network 422 and at least one base station 423. In one embodiment of the present subject matter, a device 424 communicates with the base station 423 to acquire GPS assistance data. The location center 421 may communicate a preliminary estimate of the receiver's location on the basis of the receiver's cell site. This information may then be relayed to the mobile receiver and used for location determination. The location center 421 may also receive satellite information from a GPS satellite. The satellite information may include the satellite's broadcast ephemeris information of the broadcasting satellite or that of all satellites. The location center 421 may relay the information back to the device 424 or use the information, either singularly or along with some preliminary estimation of the device's location, to assist the device in a geographic location determination. In another embodiment, the steps illustrated in FIGS. 2 and 3 may be implemented at the location center 421 and communicated to the device 424.

An apparatus according to one embodiment of the present subject matter may include a receiver or mobile device. The receiver may be utilized for cellular communication in any conventional communication format. The receiver may be, for example, a cellular device, a text messaging device, a computer, a portable computer, a vehicle locating device, a vehicle security device, a communication device, or a wireless telephone. If the receiver is a cellular device, the approximate location of the receiver may be defined as a function of an area of a cell in a cellular network, or alternatively, as a function of a location of one or more base stations in the cellular network. The receiver may receive a first plurality of signals comprising one signal from each of a first plurality of satellites. The receiver or device may also contain circuitry for determining a first location of the device as a function of the first plurality of signals and circuitry for determining a second location of the apparatus as a function of a second plurality of signals if the first location is not within a predetermined threshold, wherein the second plurality of signals is a first subset of the first plurality of signals. The receiver may also determine a third location as a function of a third plurality of signals if the second location is not within the predetermined threshold, wherein the third plurality of signals is a second subset of the first plurality of signals. The receiver may receive signals from satellites that are a part of GNSS such as GPS, QZSS, Galileo and GLONASS. The predetermined threshold may be defined by ephemeris information transmitted by one of the satellites, the lowest sum of the squared residuals, or from other information utilized in the art to determine the quality of a signal.

An apparatus according to an embodiment of the present subject matter may also include one or more processors configured to process geographic location information. In one embodiment of the present subject matter, an apparatus comprises a receiver for receiving signals from each of a plurality of satellites, a processor or other circuitry for determining a first location of the device as a function of a quality of the received signals for determining a second location of the device as a function of a subset of said received signals if said quality is not within a predetermined threshold. Such a processor(s) or circuitry may be programmed with instructions similar to those represented in the embodiments represented in FIGS. 2 and 3. Once the erroneous satellite signals have been identified, the one or more GPS processors may conduct a geographic location estimation based on the signals obtained from the unaffected satellites. Of course, the apparatus may be a mobile unit such as a cellular telephone, text messaging device, computer, portable computer, vehicle locating device, vehicle security device, communication device, wireless transceiver, or the like. Furthermore, the apparatus may receive signals from a cellular network and conduct a position determination as a function of information provided by the cellular network.

One method according to an embodiment of the present subject matter comprises receiving a first plurality of signals comprising one signal from each of a first plurality of satellites and determining a first location of the device as a function of the first plurality of signals. If the first location is not within a predetermined threshold, then the method comprises determining a second location of the device as a function of a second plurality of signals wherein the second plurality of signals is a first subset of the first plurality of signals. Of course, if the second location is not within a predetermined threshold, then the method may further comprise determining a third location of the device as a function of a third plurality of signals wherein the third plurality of signals is a second subset of the first plurality of signals.

Another method according to one embodiment of the present subject matter includes receiving a plurality of signals from a plurality of satellites, generating estimates of a location of the device using combinations of the plurality of signals, and selecting an estimate as defined by a quality of each of the combinations. The satellites may be a part of a GNSS such as GPS, Galileo, GLONASS, or QZSS. The quality may be defined by a sum of the squared residuals, ephemeris information or other information in the art adaptable to define a quality of such a signal. The device may be a mobile unit such as a cellular telephone, text messaging device, computer, portable computer, vehicle locating device, vehicle security device, communication device, and wireless transceiver. Of course, if the device is a mobile unit, the device may receive signals form a cellular network to thereby assist in the location thereof.

One method according to an embodiment of the present subject matter comprises the steps of receiving a first plurality of observations from a first plurality of satellites and determining a first position of the device as defined by a quality of the first plurality of observations. If the quality of the first plurality of observations fails to meet the predefined threshold then the device or associated processor may determine a second position of the device as defined by a quality of a second plurality of observations, the second plurality being a subset of the first plurality of observations. If the quality of the second plurality of observations fails to meet the predefined threshold then the device may calculate additional positions utilizing incrementally decreasing subsets of observations until a predetermined criteria is achieved. Exemplary criteria may be where a cardinality of observations is at least four, where the quality meets the predefined threshold, or where the quality of all subsets or combinations of satellite observations have failed to meet the predefined threshold. Of course, the quality may be defined by a sum of the squared residuals, ephemeris information or other information in the art adaptable to define a quality of such a signal. If the device is receiving signals from a cellular network, the quality may also be defined by information provided from the cellular network.

It is as aspect of the present subject matter to provide an ability to calculate a device or handset location in the presence of erroneous satellite signals to ensure that there is no performance impact for associated location services.

It is also an aspect of the present subject matter to significantly improve yield when there is a small number of measured satellite signals and one signal is erroneous. Embodiments of the present subject matter may result in a substantially one hundred percent yield even when there are several satellites having erroneous signals, and embodiments of the present subject matter operate well under incorrect cell provisioning.

As shown by the various configurations and embodiments illustrated in FIGS. 1-4, a method and apparatus for determining the geographic location of a device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. In a method for determining the location of a device receiving signals from each of a plurality of satellites, the device having determined a first location from the received signals, the improvement comprising the steps of:
   (a) comparing a quality of the first location of the device with a predetermined threshold; and
   (b) determining additional locations of the device for each different combination of the received signals while leaving out N signal from the received signals if the quality of the first location is not within the predetermined threshold,
   wherein N is a positive integer, and wherein the quality is defined by a lowest sum of the squared residuals.

2. The method of claim 1 wherein at least one of the received signals is provided by a cellular network.

3. The method of claim 2 wherein the quality is a function of information provided by the cellular network.

4. The method of claim 1 wherein the satellites are part of a Global Navigation Satellite System ("GNSS").

5. The method of claim 4 wherein the GNSS is selected from the group consisting of: Global Positioning System ("GPS"), Galileo, GLONASS, and Quasi-Zenith Satellite System ("QZSS").

6. The method of claim 1 wherein the device is a mobile unit.

7. The method of claim 6 wherein the mobile unit is selected from the group consisting of: cellular device, text messaging device, computer, portable computer, vehicle locating device, vehicle security device, communication device, and wireless transceiver.

8. A system for determining a location of a device from signals received from a plurality of Global Navigation Satellite System ("GNSS") satellites comprising:
a receiver for receiving signals from each of a plurality of satellites;
a means for determining a first location of the device as a function of a quality of the received signals; and
a means for determining additional locations of the device as a function of each subset of said received signals while leaving out N signal from the received signals if said quality is not within a predetermined threshold, wherein N is a positive integer,
wherein said quality is a function of a lowest sum of the squared residuals determined from said signals.

9. The system of claim 8 wherein the satellites are part of a Global Navigation Satellite System ("GNSS").

10. The system of claim 9 wherein the GNSS is selected from the group consisting of: Galileo, GLONASS, and Quasi-Zenith Satellite System ("QZSS").

11. The system of claim 8 wherein the satellites are Global Positioning System ("GPS") satellites.

12. The system of claim 8 wherein said quality is a function of ephemeris information transmitted by at least one satellite.

13. The system of claim 8 wherein the device is a mobile unit.

14. The system of claim 13 wherein the mobile unit is selected from the group consisting of: cellular device, text messaging device, computer, portable computer, vehicle locating device, vehicle security device, communication device, and wireless transceiver.

15. The system of claim 13 wherein the mobile unit receives signals from a cellular network.

16. The system of claim 15 wherein the location of the device is a function of information provided by the cellular network.

17. A method of calculating the position of a device comprising the steps of:
(a) receiving a first plurality of observations from a first plurality of satellites;
(b) determining a first position of the device as a function of a quality of the first plurality of observations;
(c) if the quality of the first plurality of observations fails to meet the predefined threshold then:
(i) determining a second position of the device as defined by a quality of a second plurality of observations, the second plurality being a subset of the first plurality of observations,
(ii) if the quality of the second plurality of observations fails to meet the predefined threshold then repeating step (i) for each subset of the first plurality of observations while leaving out at least one received observation, and
(iii) determining additional positions of the device using incrementally decreasing subsets of observations until a predetermined criteria is achieved.

18. The method of claim 17 wherein the criteria is a cardinality of observations is at least four.

19. The method of claim 17 wherein the criteria is the quality meets the predefined threshold.

20. The method of claim 17 wherein the criteria is the quality of all combinations of satellite observations have failed to meet the predefined threshold.

21. The method of claim 17 wherein the quality is a function of a lowest sum of the squared residuals.

22. The method of claim 17 wherein the device is receiving signals from a cellular network.

23. The method of claim 22 wherein the quality is a function of information provided from the cellular network.

24. The method of claim 17 wherein the satellites are part of a Global Navigation Satellite System ("GNSS").

25. The method of claim 24 wherein the GNSS is selected from the group consisting of: Global Positioning System ("GPS"), Galileo, GLONASS, and Quasi-Zenith Satellite System ("QZSS").

26. The method of claim 17 wherein the device is a mobile unit.

27. The method of claim 26 wherein the mobile unit is selected from the group consisting of: cellular device, text messaging device, computer, portable computer, vehicle locating device, vehicle security device, communication device, and wireless transceiver.

* * * * *